(12) United States Patent
Suonpera et al.

(10) Patent No.: US 7,881,750 B2
(45) Date of Patent: Feb. 1, 2011

(54) METHOD FOR TRANSFER OF PERSONALISED INFORMATION

(75) Inventors: Allan Suonpera, Helsinki (FI); Juha Kurkilahti, Pllkkio (FI); Elise Levanto, Helsinki (FI); Peter Ollikainen, Lempaala (FI)

(73) Assignee: Nokia Corporation, Espoo (FI)

( * ) Notice: Subject to any disclaimer, the term of this patent is extended or adjusted under 35 U.S.C. 154(b) by 554 days.

(21) Appl. No.: 09/788,493

(22) Filed: Feb. 21, 2001

(65) Prior Publication Data

US 2001/0041592 A1 Nov. 15, 2001

(30) Foreign Application Priority Data

Feb. 21, 2000 (GB) ................................. 0004037.8

(51) Int. Cl.
*H04B 1/38* (2006.01)
(52) U.S. Cl. ...................... 455/557; 455/558; 455/559; 455/420
(58) Field of Classification Search ................ 455/557, 455/558, 559, 420
See application file for complete search history.

(56) References Cited

U.S. PATENT DOCUMENTS

| | | | | |
|---|---|---|---|---|
| 5,524,276 | A * | 6/1996 | Littig et al. | 455/418 |
| 5,763,805 | A * | 6/1998 | Yamabata et al. | 84/645 |
| 6,301,471 | B1 * | 10/2001 | Dahm et al. | 455/405 |
| 6,546,262 | B1 * | 4/2003 | Freadman | 455/557 |
| 6,601,232 | B1 * | 7/2003 | Burba et al. | 717/100 |
| 6,625,445 | B1 * | 9/2003 | Ishigami | 455/419 |
| 6,708,045 | B1 * | 3/2004 | Lieu et al. | 455/557 |
| 7,149,509 | B2 * | 12/2006 | Shanahan | 455/418 |

FOREIGN PATENT DOCUMENTS

EP 0827353 3/1998

(Continued)

OTHER PUBLICATIONS

Readme.text, Nokia Data Suites 3.0, Nokia Mobile Phones, 1999.

(Continued)

*Primary Examiner*—Yuwen Pan
(74) *Attorney, Agent, or Firm*—Banner & Witcoff, Ltd

(57) ABSTRACT

Personalized information is transferred from a first hand portable phone having a first memory means for storing said personalized information to a second hand portable phone having a second memory means for storing said personalized information. A connection between said first hand portable phone and a computer on which a data transfer application is running is established. The data transfer application on said computer is controlled to read said personalized information from said first memory means to store the personalized information in said first hand portable phone in memory means associated with said data transfer application in said computer. Then a connection between said second hand portable phone and said computer on which said data transfer application is running is established. The data transfer application on said computer is controlled to write said personalized information from said memory means associated with said data transfer application into said second memory means for storing said personalized information in said second hand portable phone. The user is allowed to individually select the type of personalized information to be written into said second memory means prior to the initializing of the data transfer.

15 Claims, 5 Drawing Sheets

FOREIGN PATENT DOCUMENTS

| | | |
|---|---|---|
| GB | 2251357 | 7/1992 |
| GB | 2251357 A | 7/1992 |
| GB | 2294787 | 5/1996 |
| GB | 2310110 | 8/1997 |
| GB | 2310110 A | 8/1997 |
| GB | 2313519 | 11/1997 |
| GB | 2313519 A | 11/1997 |
| JP | 11-55422 | 2/1999 |

OTHER PUBLICATIONS

Troubleshooting.txt, Nokia Data Suites 3.0, Nokia Mobile Phones, 1999.

DCOM95 1.2 (extended support for Distributed Component Object Model (DCOM) for Microsoft Windows® 95), Release Notes, Jul. 28, 1998.

Quick Guide "Using FoneSync 4.0 to store contacts in a Nokia 7110 without synchronization", Nokia 7110, Nokia, 1995-1999.

* cited by examiner

METHOD FOR TRANSFER OF PERSONALISED INFORMATION

BACKGROUND OF THE INVENTION

The invention relates to protection of personalised information in a hand portable phone in order to avoid this data becoming lost.

During recent years it has become widely used to integrate applications into cellular phones allowing the user to personalize his phone. There is a trend saying that the phones will become even more personalised in the future and therefor there is a clear need for protecting this data.

SUMMARY OF THE INVENTION

According to a first aspect of the invention there is provided a method for transferring personalised information from a first hand portable phone having a first memory means for storing said personalised information to a second hand portable phone having a second memory means for storing said personalised information. The method includes establishing a connection between said first hand portable phone and a computer on which a data transfer application is running, controlling the data transfer application on said computer to read said personalised information from said first memory means for storing said personalised information in said first hand portable phone to memory means associated with said data transfer application in said computer, establishing a connection between said second hand portable phone and said computer on which said data transfer application is running, and controlling the data transfer application on said computer to write said personalised information from said memory means associated with said data transfer application to said second memory means for storing said personalised information in said second hand portable phone. When the user changes his phone, he is according to the invention able to read the personalised information stored in the old phone into a computer, preferably a PC, and then write the personalised information from the computer into his new phone. The computer readable program code means allows the user to individually select the type of personalised information to be written into said memory means prior to the initializing of the data transfer. Here it will be much easier to change phones or to have more than one phone.

According to the preferred embodiment of the invention the personalised information includes phonebook content, message content, profile setting, phone and call settings and service settings. The established connection between the computer and said first and second phone is according to the preferred embodiment of the invention a wire-based data connection.

Preferably, the data transfer application evaluates the second phones capabilities to receive said personalised information prior to a transfer of the personalised information to the second phone, adapts, when needed, said personalised information so it fits with the second phones capabilities to receive said personalised information, and transfers said adapted personalised information the second phone.

According to a second aspect of the invention there is provided a method of making a back-up of personalised information stored in a hand portable phone having memory means for storing said personalised information, comprising steps of establishing a connection between said hand portable phone and a computer on which a data transfer application is running, and controlling the data transfer application on said computer to read said personalised information from said memory means for storing said personalised information in said hand portable phone to memory means associated with said data transfer application in said computer. The computer readable program code means allows the user to individually select the type of personalised information to be read from said memory means prior to the initialising of the data transfer. Hereby the user has a possibility for storing a back-up version of the personalised information in his phone. The user stores the personalised information in a continuous process during the lifetime of the phone. Therefor it is very useful for the user to have the possibility to save the personalised information in a back up version.

According to a third aspect of the invention there is provided a computer program product for transferring personalised information from one phone to another, and comprising a computer useable medium having computer readable program code means embodied therein. The computer readable program code means in the computer program product comprises computer readable program code means for establishing a connection between said first hand portable phone and a computer on which a data transfer application is running, computer readable program code means for controlling the data transfer application on the computer to read said personalised information from said first memory means for storing said personalised information in said first hand portable phone to memory means associated with said data transfer application in the computer, computer readable program code means for establishing a connection between said second hand portable phone and the computer on which said data transfer application is running, and computer readable program code means for controlling the data transfer application on said computer to write said personalised information from said memory means associated with said data transfer application to said second memory means for storing said personalised information in said second hand portable phone. said computer readable program code means allows the user to individually select the type of personalised information to be written into said memory means prior to the initialising of the data transfer. The computer program product will preferably be distributed on a CD-ROM or via the Internet.

According to a third aspect of the invention there is provided a computer program product for making a back-up of personalised information stored in a hand portable phone, and comprising a computer useable medium having computer readable program code means embodied therein. The computer readable program code means in the computer program product comprising computer readable program code means for establishing a connection between said hand portable phone and a computer on which a data transfer application is running, and computer readable program code means for controlling the data transfer application on said computer to read said personalised information from said memory means for storing said personalised information in said hand portable phone to memory means associated with said data transfer application in said computer. The computer program product will preferably be distributed on a CD-ROM or via the Internet.

The application for transferring personalized information allows the user to back up all data to a PC and restore it again. This feature is useful corporate tool to build similar functionality and with the same updated information to all corporate phones. The pre-set functions such as, WAP Bookmarks, the entire Company Phone Directory and even with company logo can be stored to the phone memory to be used as header for personalized messaging.

BRIEF DESCRIPTION OF THE DRAWINGS

For a better understanding of the present invention and to understand how the same may be brought into effect reference will now be made, by way of example only, to accompanying drawings, in which.

DETAILED DESCRIPTION OF INVENTION

Figure 1:
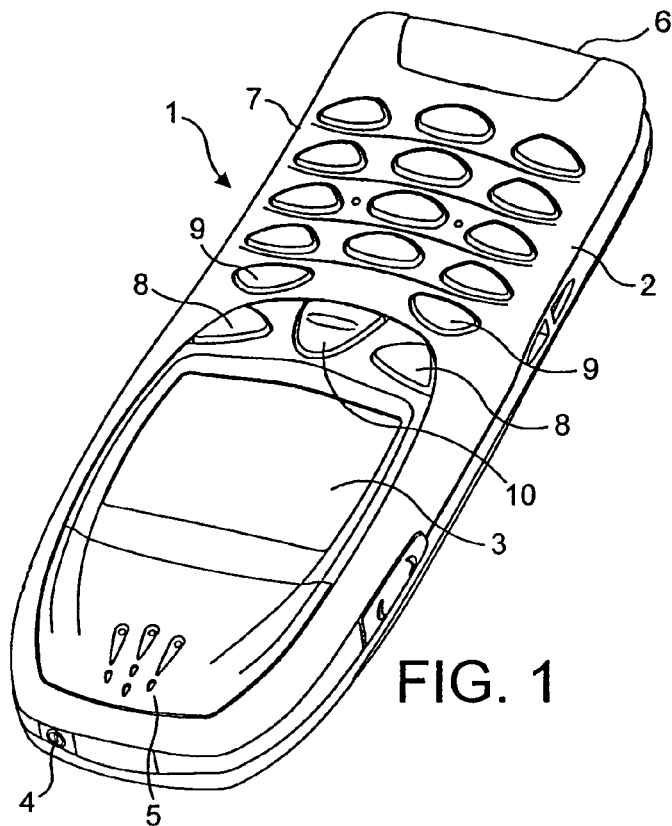
FIG. 1 illustrates in perspective a handportable phone.

FIG. 1 shows a preferred embodiment of a phone according to the invention, and it will be seen that the phone, which is generally designated by 1, comprises a user interface having a keypad 2, a display 3, an on/off button 4, a speaker 5, and a microphone 6 (openings present in the bottom of the phone and therefore not visible in the present view). The phone 1 according to the preferred embodiment is adapted for communication via a cellular network, e.g. the GSM 900/1800 MHz network.

According to the preferred embodiment the keypad 2 has a first group 7 of keys as alphanumeric keys, two soft keys 8, two call handling keys 9, and a cursor navigation key 10. The present functionality of the soft keys 8 is shown in separate fields in the display 3 just above the keys 8, and the call handling keys 9 are used for establishing a call or a conference call, terminating a call or rejecting an incoming call.

Figure 2:
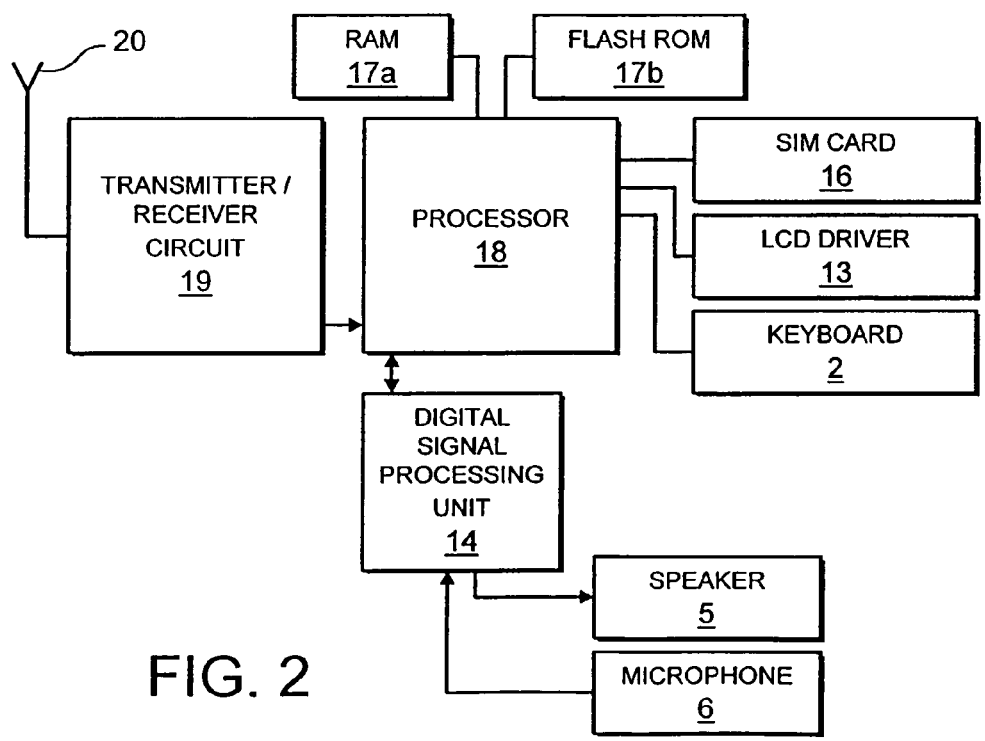
FIG. 2 schematically shows the essential parts of a telephone for communication with a cellular network.

FIG. 2 schematically shows the most important parts of a preferred embodiment of the phone, said parts being essential to the understanding of the invention. The processor 18 controls the communication with the network via the transmitter/receiver circuit 19 and an internal antenna 20.

The microphone 6 transforms the user's speech into analgue signals, the analogue signals formed thereby are A/D converted in an A/D converter (not shown) before the speech is encoded in a digital signal processing unit 14 (DSP). The encoded speech signal is transferred to the processor 18, which i.a. supports the GSM terminal software. The processor 18 also forms the interface to the peripheral units of the apparatus, including a RAM memory 17a and a Flash ROM memory 17b, a SIM card 16, the display 3 and the keypad 2 (as well as data, power supply, etc.). The digital signal-processing unit 14 speech-decodes the signal, which is transferred from the processor 18 to the earpiece 5 via a D/A converter (not shown).

Figure 3:
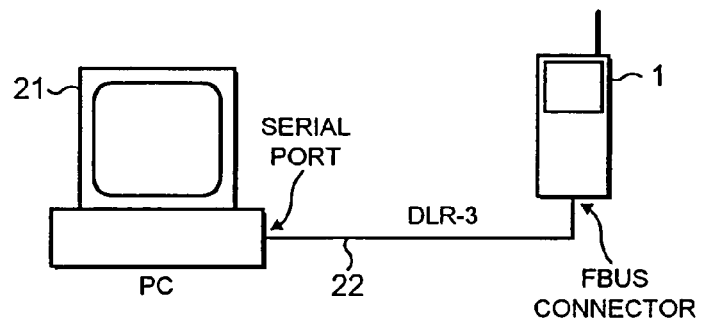
FIG. 3 shows a phone connected to a computer having an application for transferring personal information between the phone and the computer according to the preferred embodiment of the invention.

FIG. 3 shows how the phone 1 according to the preferred embodiment of the invention is connected to a computer 21, e.g. a personal computer (PC), via a data cable 22, e.g. a DLR-3 (a Nokia accessory). The data cable is connected between one of the serial ports on the computer 21 and FBUS connector on the phone 1. Alternatively a wireless connection based on e.g. the Bluetooth protecol may be used for the data transfer.

Figure 4:
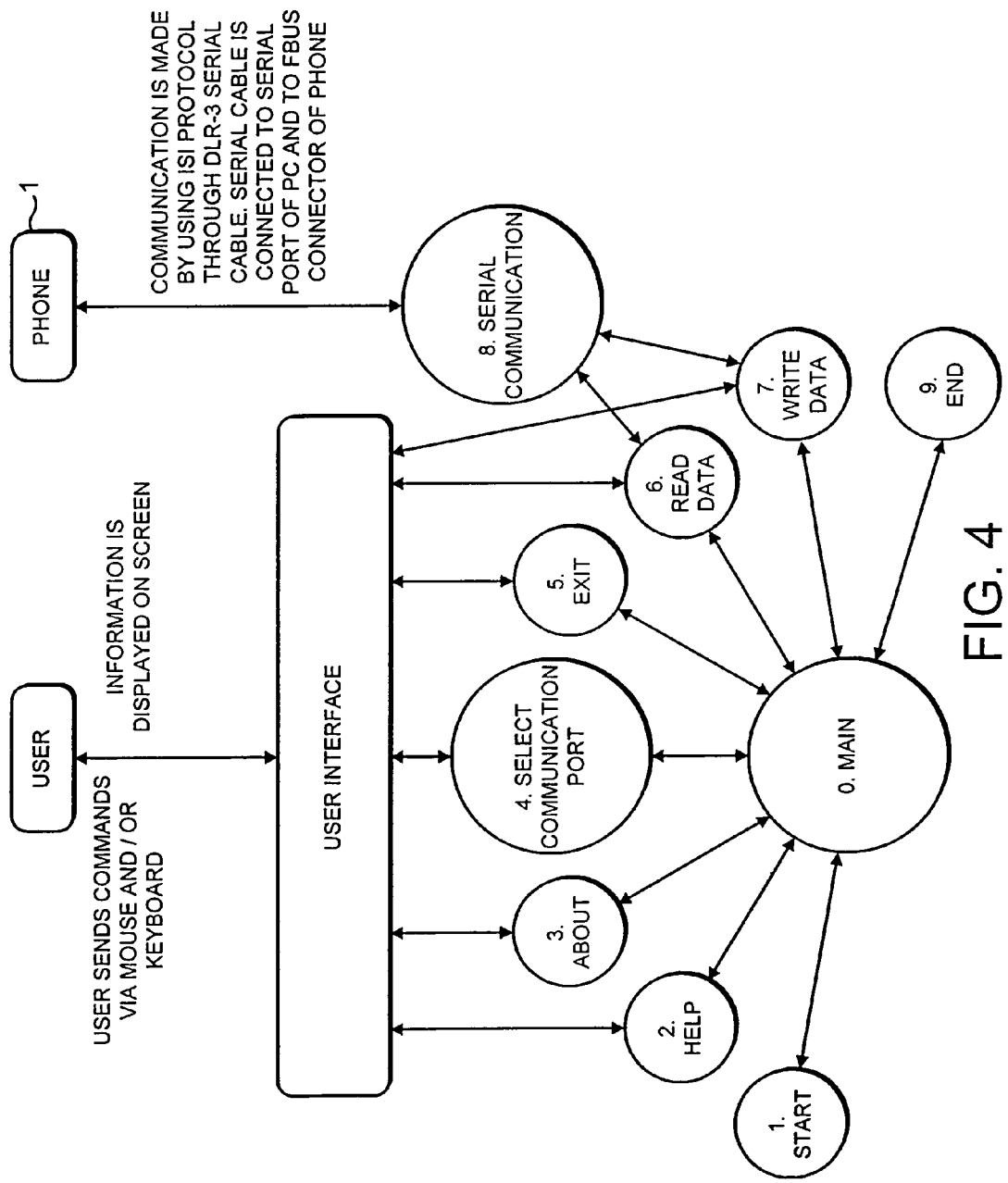
FIG. 4 shows how the user controls the application for transferring personal information between a phone and a computer according to the preferred embodiment of the invention.

FIG. 4 shows how the user according to the preferred embodiment of the invention may control the application for transferring personal information between phone 1 and the computer 21. Via the user interface of the computer 21 (mouse, keyboard and display) the user, when he has started the application, may select "help", "about", "select communication port", "exit", "read data", "write data" and "end". When "read data" or "write data" is selected data is transferred via the serial communication link 21.

The implementation of software application according to the preferred embodiment of the invention enables the data transfer of personalised information from one mobile phone to another. In the following part of this document the software requirements for the software application that enables the data transfer of personalised information from one handportable phone to another is defined.

Terms, Acronyms and Abbreviations
    FBUS Fast asynchronous serial bus used in Nokia phones launched in 1998 and later, such as Nokia 6110 and Nokia 7110.
    IrDA Infrared Data Association, known from e.g. Nokia 7110.
    ISI Intelligent Service Interface, known from e.g. Nokia 7110.
    ISA Intelligent Software Architecture, known from e.g. Nokia 7110.
    ME Mobile Equipment e.g. a mobile phone.
    SCM Short Code Memory; phone book, known from e.g. Nokia 7110.

Data Transfer Bus Requirements

The requirements for data transfer bus are presented in table 1.

TABLE 1

| Property | Value |
|---|---|
| Communication port (PC) | Serial port (mandatory); IR port (optional) |
| Communication port (phone) | FBUS |
| Data transfer protocol | ISI and FBUS |
| Data transfer cable | DLR-3 |

A list of information to be transferred from/to the phone is presented in table 2.

TABLE 2

| | | |
|---|---|---|
| PHONEBOOK | Entry (both ME and SIM) | Mandatory |
| | Settings | Mandatory |
| | Caller groups | Mandatory |
| | Speed dials | Mandatory |
| MESSAGES | Inbox | Mandatory |
| | Outbox | Mandatory |
| | Archive | Mandatory |
| | Templates | Mandatory |
| | User defined folders | Mandatory |
| | Message settings | Mandatory |

TABLE 2-continued

| | | |
|---|---|---|
| CALL REGISTER | Missed calls | Optional |
| | Dialled numbers | Optional |
| | Received calls | Optional |
| | Call duration/last call duration | Optional |
| | Call duration/dialled calls' duration | Optional |
| | Call duration/received call's duration | Optional |
| | Call duration/all calls' duration | Optional |
| | Call cost/last call cost | Optional |
| | Call cost/All calls' units | Optional |
| PROFILES | Personalise/Alert | Mandatory |
| | Personalise/Incoming call alert | Mandatory |
| | Personalise/ringing tone | Mandatory |
| | Personalise/ringing volume | Mandatory |
| | Personalise/vibrating alert | Mandatory |
| | Personalise/message alert tone | Mandatory |
| | Personalise/keypad tones | Mandatory |
| | Personalise/warning tones | Mandatory |
| SETTINGS | Alarm clock | Mandatory |
| | Clock | Mandatory |
| | Call settings/own number sending | Mandatory |
| | Call settings/anykey answer | Mandatory |
| | Call settings/automatic redial | Mandatory |
| | Call settings/speed dialling | Mandatory |
| | Call settings/call waiting | Mandatory |
| | Call settings/line for outgoing calls | Mandatory |
| | Call settings/summary after call | Mandatory |
| | Call settings/fax or data call | Mandatory |
| | Phone settings/language | Mandatory |
| | Phone settings/cell info display | Mandatory |
| | Phone settings/welcome note | Mandatory |
| | Phone settings/network selection | Mandatory |
| | Phone settings/confirm SIM service actions | Mandatory |
| | Communication settings/info service | Mandatory |
| | Communication settings/voice mailbox number | Mandatory |
| | Security settings/PIN code request | Mandatory |
| | Security settings/outgoing calls | Mandatory |
| | Security settings/international calls | Mandatory |
| | Security settings/international calls except to home country | Mandatory |
| | Security settings/incoming calls | Mandatory |
| | Security settings/incoming calls when abroad | Mandatory |
| | Security settings/cancel all barrings | Mandatory |
| | Security settings/fixed dialling | Mandatory |
| | Security settings/closed user group | Mandatory |
| | Security settings/security level | Mandatory |
| | Security settings/security code | Optional |
| | Security settings/PIN code | Optional |
| | Security settings/PIN2 code | Optional |
| | Security settings/barring password | Optional |
| CALL DIVERT | Call divert | Mandatory |
| GAMES | Games/High score data | Optional |
| | Games/Level | Optional |
| | Games/Sounds | Optional |
| | Games/Lights | Optional |
| CALENDAR | Notes | Mandatory |
| | Settings | Mandatory |
| SERVICES (WML BROWSER) | Settings | Mandatory |

The requirements to the PC hardware are listed in table 3

TABLE 3

| Parameter | Value | Necessity |
|---|---|---|
| Processor | >= Pentium 133 MHz | Mandatory |
| RAM | >= 32 MB | Mandatory |
| Free hard disk space | >= 20 MB | Mandatory |
| External data interface | Serial port (RS-232) | Mandatory |
| External data interface | IR (IrDA compatible) | Optional |
| Operating system | Windows 95/98/NT 4.0 (with SP 3 or later) | Mandatory |

In practice the above values are just nominal because there are no special requirements (i.e. special graphics card) and the most important factor is that the selected operating system generally works smoothly in the PC.

According to the preferred embodiment the phone has to support the following protocols: ISI, and FBUS and the phone has to have the following connections to the PC: DLR-3/FBUS and IR/IrDA.

The data read/write is according to the preferred embodiment of the invention to be made through a single serial port. In case the hardware provides several serial ports only one is used according to the preferred embodiment of the invention. However for supporting future expansions it is recommended to design application in the way that allows the use of multiple serial ports.

Usability

According to the preferred embodiment of the invention the application for controlling the transfer of personal data from a mobile phone to a PC is controlled from the PC shown in FIG. 3. The same applies when data is stored in the phone from the PC. The users are assumed to have a basic knowledge of the Windows® operating system and they know how to use a mobile phone, e.g. having a UI style known from the Nokia 6110.

Figure 5:
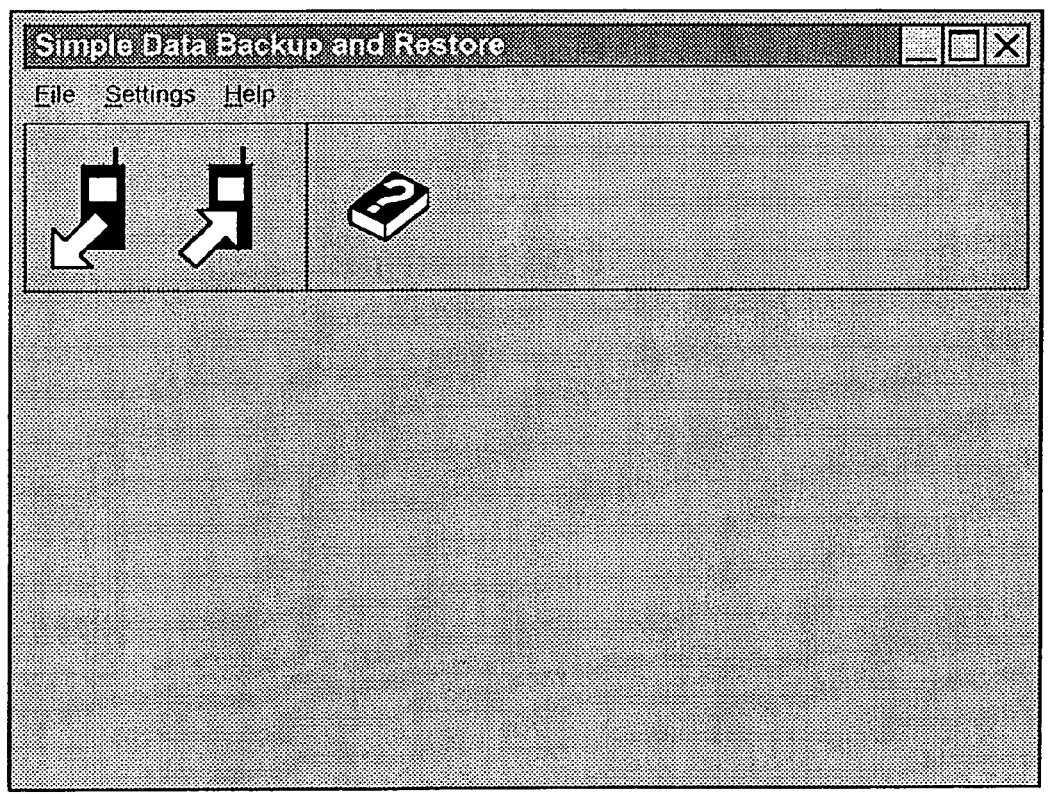
FIG. 5 shows the user interface of the application according to the preferred embodiment of the invention.

The user interface of the application is presented in FIG. 5. The user will see this window when the application is started. The main interface includes a tool bar, which contains buttons for "Read from phone", "Write to phone" and "Help". There also exists a menu bar, which contains the following structure:

1. File
   (a) Read from phone
   (b) Write to phone
   (c) Exit
2. Settings
   (a) Connection . . .
3. Help
   (a) Contents
   (b) About . . .

Read From Phone

Figure 6:
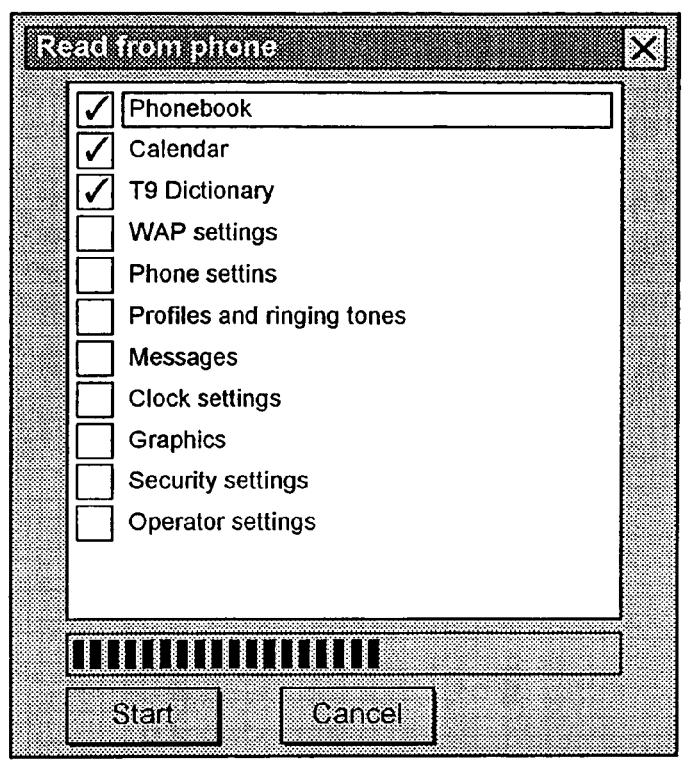
FIG. 6 shows a "read from phone" dialog box in the application according to the preferred embodiment of the invention.

When user has selected "Read from phone" either from menu bar (File/Read from phone) or toolbar, a dialog box will pop up as shown in FIG. 6. The properties (or items) to be read are listed in a check box list. The items that have been read are checked. The progress bar at the bottom of the dialog indicates the current reading operation. It always start from zero (or from the left side) and ends at the maximum state (or to the right side). The Start button starts the reading sequence and alternatively the cancel button exits from the dialog. Dialog is automatically closed when all properties are read successfully.

Write to Phone

Figure 7:
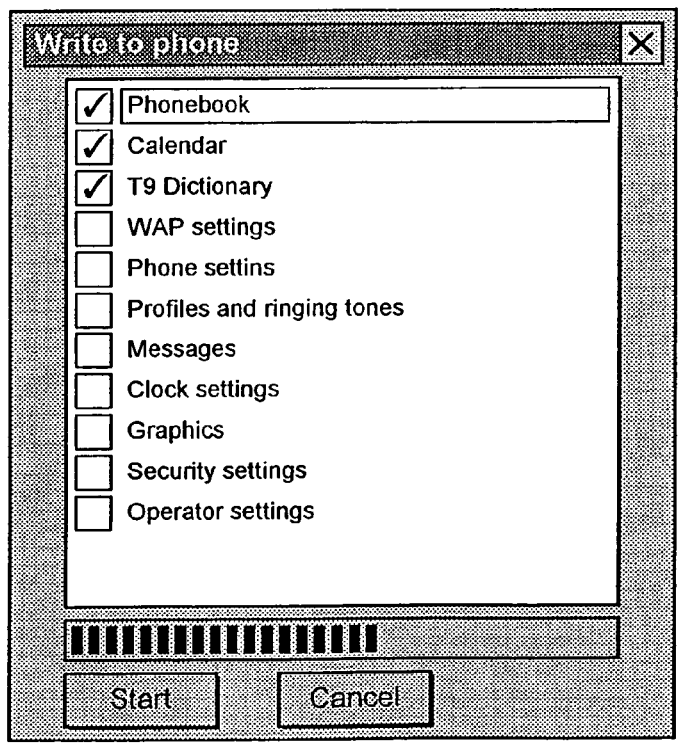
FIG. 7 shows a "write to phone" dialog box in the application according to the preferred embodiment of the invention.

When user has selected "Write to phone" either from menu bar (File/Write to phone) or tool bar there will pop up a dialog as presented in FIG. 7. The properties (or items) to be written are in a check box list. The items that have been written are checked. The progress bar at the bottom of the dialog indicates the current writing operation. It always start from zero (or from the left side) and ends to the maximum state (or to the right side). The Start button starts the writing sequence and alternatively the cancel button exits from the dialog. Dialog is automatically closed when all properties are written successfully.

When user has selected "Exit" from menu bar (File/Exit) an "Exit" message dialog box (not shown) will pop up asking the user to confirm this operation and indicating that data will be lost if this is the case. If user selects the button, "Yes", for confirmation, the application is closed. Alternatively button "No" closes only the message dialog and the application is not terminated.

When user has selected "Connection . . . " from menu bar (Settings /Connection . . . ) a "connection dialog box will pop up (not shown). Available serial ports are read from the registry of Windows and listed in a combo box. From combo box the user can select the serial port to be used for serial communication with the phone. A button, "Test", informs the user whether the phone is connected via selected serial port or not. A button, "OK", also performs the same connection test as button, "Test", but not in case the serial port is already tested. The button, "OK" always closes the dialog in spite of the validity of serial connection.

"About" from menu bar (Help/About . . . ) and "Help" either from menu bar (Help/Contents) or from tool bar works as any other Windows® application. When problems occur during the execution of the application, the application checks what has caused the problem and displays an error message.

EXAMPLES a

TABLE 4

| Function | Error | Error message |
|---|---|---|
| Read data from phone | Received data is invalid | Invalid data. |
| Read data from phone | Serial communication does not work | Serial communication error. Make sure the phone is connected to the serial port with DLR-3 serial cable and check out that the right serial port is active (from menu Settings/Connection). |
| Write data to phone | Received data is invalid | Error while sending data to phone. |
| Write data to phone | Serial communication does not work | Serial communication error. Make sure the phone is connected to the serial port with DLR-3 serial cable and check out that the right serial port is active (from menu Settings/Connection). |
| Selection of the serial port | Serial communication does not work | Serial communication error. Make sure the phone is connected to the serial port with DLR-3 serial cable. |

Requests and Responses

Figure 8:
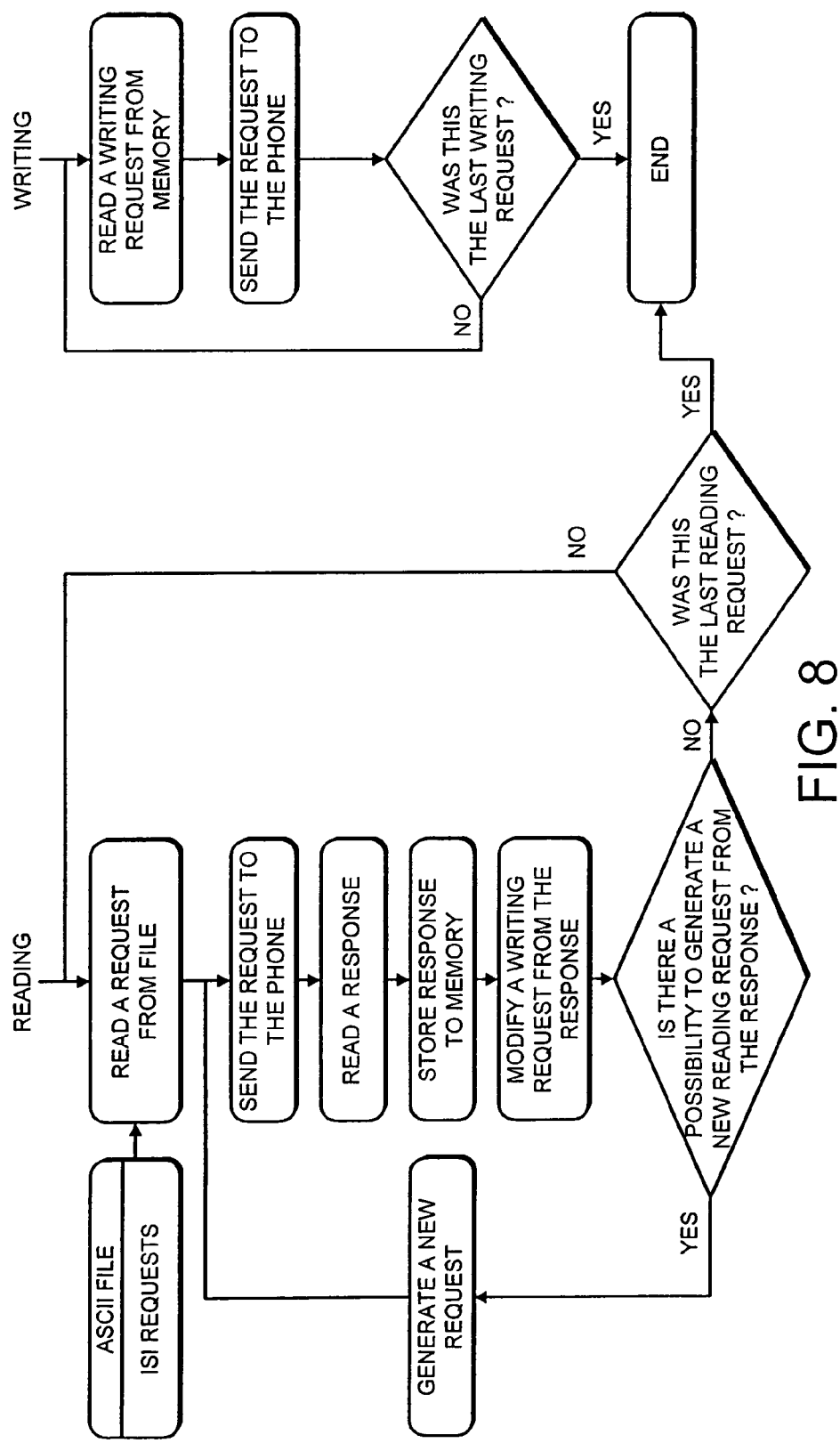
FIG. 8 illustrates the principle of requests and responses in the application according to the preferred embodiment of the invention.

The requests for reading data from the ISI servers are stored in ASCII files REQx.txt, where x=server ID. All reading requests are not included in the files while in the case of data lists (i.e. phonebook entries or calendar notes) the requests are generated from the responses (only the first request is included in the file). The writing requests are generated from the responses of reading requests. In some cases there is only need to change the message id, while the data remains same. In some cases some data must also be removed while responses may have some additional information that is not needed in writing requests. The principle of Requests and responses is presented in FIG. 8

Virtual Servers

The information read and/or written from/to phone is grouped as phonebook, calendar, clock etc. In practice the actual message handling in the phone is based on same kind of grouping. There are several ISI servers like phonebook, calendar, clock etc. However there are also some specific cases like T9, which is based on special message type.

In order to make the relation between user interface and actual serial communication functions simple, there are used a principle of virtual servers are used. It means that in user interface the information can be grouped as it is most convenient for the user and the implementation of serial communication functions is based on these same groups.

As most of the communication messages are created during the operation the communication functions are based also on these data groups. The main reason is not the data grouping but the different structures of messages. Some request/response pairs use similar data blocks, but in some cases there are specific differences that must be handled by special cases.

The use of a virtual server makes it possible to define also messages of T9 as these would be real ISI messages of "T9 ISI server".

According to the preferred embodiment of the invention the application for transferring personal information when it starts reading the personal information to be transferred sends successive read requests to the phone.

This e.g. starts with a request for reading the first phonebook record. The phone then replies by transferring the content of the first record to the PC application that stores this record on the hard disk of the PC. Each record may include several data fields, such as name, phone number, mobile number, private number, fax number, local number, E-mail address. This continues until all phonebook records are read. If a record is empty there is no need for storing the full empty record on the hard disk, and therefor the application sets a flag indicating that this record is empty and when the personal information later on is transferred to another phone this empty record will not become part of the transfer.

Hereafter the application reads and stores the message content, profile settings, the phone and call settings on the hard disk of the PC. Furthermore the application reads and stores the WML Browser service settings. This is very useful since the WAP settings are operator dependent. Furthermore the call register may be read and stored in the same way if the user requests this.

Basically the application according to the preferred embodiment of the invention may be used as a back up application, too. Hereby the personal information is pasted into the same phone as it was originally copied from.

According to an alternative embodiment of the invention the application for transferring personal information also requests the reading of the content of the Calendar of the phone, voice tags stored in association with phonebook records for voice dialling, executable operations in the menu structure of the phone for voice control of the menu etc.

According to the preferred embodiment of the invention the application for transferring personal information. It starts by sending a request to the receiving phone for writing data into a first data field of a first phonebook record. The phone processor gives a reply including a confirmation or rejection of the presence of this record. Furthermore the reply includes information about the data fields and their size. Then the application evaluates the data in relation to the received information. If minor adaptations of data is needed, e.g. truncation of a name label is required this is done. Then the data that fits into the data fields of the phone is transferred to the receiving phone. This continues until all phonebook records are transferred. The application does not evaluate records for which a flag indicating that this record is empty is set. However if the phonebook of the receiving phone is too small the application will store data in records for which a flag indicating that this record is empty is set, too.

Hereafter the application writes the message content, profile settings, the phone and call settings, and WML Browser service settings, call register (optional) into the receiving phone. The writing may include the content of the Calendar of the phone, voice tags stored in association with phonebook records for voice dialling, executable operations in the menu structure of the phone for voice control of the menu etc.

According to a further alternative embodiment of the invention the connection set up between the phone and the computer is a secure WAP session and the session is controlled from the phone. The computer on which the application for transferring personal information is executed is placed at e.g. the operator in order to ensure the user a back up of his transferred personal information.

What is claimed is:

1. A method comprising:
    receiving, at a computing device, a request to write previously stored personalized information stored at the computing device to a first mobile communication device different from the computing device;
    displaying, by the computing device, a selection interface including a list of a plurality of personalized information types previously stored at the computing device, wherein the plurality of previously stored personalized information types includes at least one of: a calendar, a phonebook and a message;
    receiving, through an input of the computing device, individual user selections of multiple previously stored personalized information types from the list of previously stored personalized information types in the displayed selection interface to send to the first mobile communication device, the input being different from the first mobile communication device; and
    after receiving the individual user selections, sending previously stored personalized information corresponding to the selected personalized information types to the first mobile communication device from the computing device, wherein sending the previously stored personalized information includes:
        transmitting, to the first mobile communication device, a request to write a first information record of the previously stored personalized information;
        in response to the request, receiving an indication from the first mobile communication device, the indication specifying whether the first information record already exists in the first mobile communication device;
        determining whether the first information record is flagged, wherein flagging of an information record indicates that the information record is empty; and
        evaluating the first information record in relation to data field information received from the first mobile communication device only when the first information record is not flagged.

2. The method of claim 1, further comprising:
    evaluating the first mobile communication device's capabilities to receive the previously stored personalized information, wherein the previously stored personalized information includes at least one information record, each of the at least one information record corresponding to a single entry in the at least one of: mobile communication device settings, the calendar, the phonebook and the message; and
    reformatting each of the at least one information record in accordance with the first mobile communication device's capabilities prior to sending the previously stored personalized information to the first mobile communication device.

3. The method of claim 2, wherein the first mobile communication device's capabilities include an available data field size for storing each of the at least one information record.

4. The method of claim 3, wherein reformatting each of the at least one information record includes truncating each of the at least one information record to fit within the data field size of the first mobile communication device.

5. The method of claim 2, wherein reformatting the at least one information record includes modifying a data type of at least one field of the at least one information record.

6. One or more non-transitory computer readable media storing computer readable instructions that, when executed, cause an apparatus to:
    receive a request to write previously stored personalized information stored at the apparatus to a first mobile communication device different from the apparatus;
    display a selection interface including a list of a plurality of personalized information types previously stored at the apparatus, wherein the plurality of previously stored personalized information types include at least one of: a calendar, a phonebook and a message;
    receive, through an input of the apparatus, individual user selections of multiple personalized information types from the list of previously stored personalized information types in the displayed selection interface to send to the first mobile communication device, wherein the input is different from the first mobile communication device; and
    after receiving the individual user selections of the multiple personalized information types, send previously stored personalized information corresponding to the selected personalized information types to the first mobile communication device from the apparatus, wherein sending the previously stored personalized information includes:
        transmitting, to the first mobile communication device, a request to write a first information record of the previously stored personalized information;
        in response to the request, receiving an indication from the first mobile communication device, the indication specifying whether the first information record already exists in the first mobile communication device;
        determining whether the first information record is flagged, wherein flagging of an information record indicates that the information record is empty; and
        evaluating the first information record in relation to data field information received from the first mobile communication device only when the first information record is not flagged.

7. The one or more computer readable media of claim 6 wherein the computer readable instructions, when executed, further cause the apparatus to:
    evaluate the first mobile communication device's capabilities to receive the personalized information, wherein the personalized information includes at least one information record, each of the at least one information record corresponding to a single entry in the at least one of: the calendar, the phonebook and the message; and
    reformat each of the at least one information record in accordance with the first mobile communication device's capabilities prior to sending the personalized information to the first mobile communication device.

8. The one or more computer readable media of claim 7, wherein the first mobile communication device's capabilities include a data field size of a data record for storing the personalized information.

9. The one or more computer readable media of claim 8, wherein reformatting each of the at least one information record includes truncating each of the at least one information record to fit within the data field size of the first mobile communication device.

10. An apparatus comprising:

at least one processor; and memory operatively coupled to the at least one processor and storing computer readable instructions that, when executed, cause the apparatus to:

receive a request to write previously stored personalized information stored at the apparatus to a first mobile communication device different from the apparatus;

display a selection interface including a list of a plurality of personalized information types previously stored at the apparatus wherein the plurality of previously stored personalized information types include at least one of: a calendar, a phonebook and a message;

receive, through an input of the apparatus, individual user selections of multiple personalized information types from the list of the plurality of previously stored personalized information types in the displayed selection interface to transfer from the apparatus to the first mobile communication device, wherein the input is different from the first mobile communication device; and after receiving the individual user selections, send previously stored personalized information corresponding to the selected personalized information types to the first mobile communication device from the apparatus, wherein sending the previously stored personalized information includes:

transmitting, to the first mobile communication device, a request to write a first information record of the previously stored personalized information;

in response to the request, receiving an indication from the first mobile communication device, the indication specifying whether the first information record already exists in the first mobile communication device;

determining whether the first information record is flagged, wherein flagging of an information record indicates that the information record is empty; and evaluating the first information record in relation to data field information received from the first mobile communication device only when the first information record is not flagged.

11. The apparatus of claim 10, wherein the computer readable instructions, when executed, further cause the apparatus to:

evaluate the first mobile communication device's capabilities to receive the previously stored personalized information, wherein the previously stored personalized information includes at least one information record, each of the at least one information record corresponding to a single entry in the at least one of: the calendar, the phonebook and the message; and reformat each of the at least one information record in accordance with the first mobile communication device's capabilities prior to sending the personalized information to the first mobile communication device.

12. The apparatus of claim 11, wherein the first mobile communication device's capabilities include an available data field size for storing each of the at least one information record.

13. The apparatus of claim 12, wherein reformatting each of the at least one information record includes truncating each of the at least one information record to fit within the data field size of the first mobile communication device.

14. The apparatus of claim 10, wherein sending the previously stored personalized information includes:

displaying, in a list, each of the selected personalized information types that has not been sent to the first mobile communication device in a first state and each of the selected personalized information type that has been sent to the first mobile communication device in a second state different from the first state.

15. The apparatus of claim 10, wherein flagging of empty information records is performed upon receipt of the information record at the apparatus.

* * * * *

UNITED STATES PATENT AND TRADEMARK OFFICE
CERTIFICATE OF CORRECTION

| | | |
|---|---|---|
| PATENT NO. | : 7,881,750 B2 | Page 1 of 1 |
| APPLICATION NO. | : 09/788493 | |
| DATED | : February 1, 2011 | |
| INVENTOR(S) | : Allan Suonpera et al. | |

It is certified that error appears in the above-identified patent and that said Letters Patent is hereby corrected as shown below:

On the title page, item [75] under Inventors:
Please delete "Pllkkio" and insert --Piikkio--

Signed and Sealed this
Tenth Day of January, 2012

David J. Kappos
*Director of the United States Patent and Trademark Office*